United States Patent [19]
Herchenbach et al.

[11] 4,218,209
[45] Aug. 19, 1980

[54] METHOD AND APPARATUS FOR THE THERMAL TREATMENT OF FINE-GRAINED MATERIAL WITH HOT GASES

[75] Inventors: Horst Herchenbach, Troisdorf; Hubert Ramesohl, Bergisch-Gladbach, both of Fed. Rep. of Germany

[73] Assignee: Klöckner-Humboldt-Wedag AG, Fed. Rep. of Germany

[21] Appl. No.: 933,484

[22] Filed: Aug. 14, 1978

[30] Foreign Application Priority Data

Aug. 13, 1977 [DE] Fed. Rep. of Germany ....... 2736579

[51] Int. Cl.² ........................... F27B 15/00; C04B 7/02
[52] U.S. Cl. ........................................ 432/14; 106/100
[58] Field of Search ............... 110/226; 432/14, 15, 432/58, 106; 106/100

[56] References Cited

U.S. PATENT DOCUMENTS

| | | | |
|---|---|---|---|
| 2,043,459 | 6/1936 | Windecker | 110/226 |
| 4,004,876 | 1/1977 | Sylvest | 432/58 |
| 4,083,676 | 4/1978 | Ritzmann et al. | 432/14 |

*Primary Examiner*—John J. Camby
*Attorney, Agent, or Firm*—Hill, Van Santen, Steadman, Chiara & Simpson

[57] ABSTRACT

Method and apparatus for heat treatment of comminuted raw material of the type used, for example, for the production of cement in which the material is preheated in a preheater by means of hot exhaust gases from a kiln, the material is separately calcined for the deacidification of a portion of the calcium carbonate present and is subsequently burnt to completion in the kiln. The specific improvement of the present invention involves utilizing undispersed coarse pieces of fuel for the separate calcination and conducting the separate calcination at the material inlet end to the kiln.

2 Claims, 1 Drawing Figure

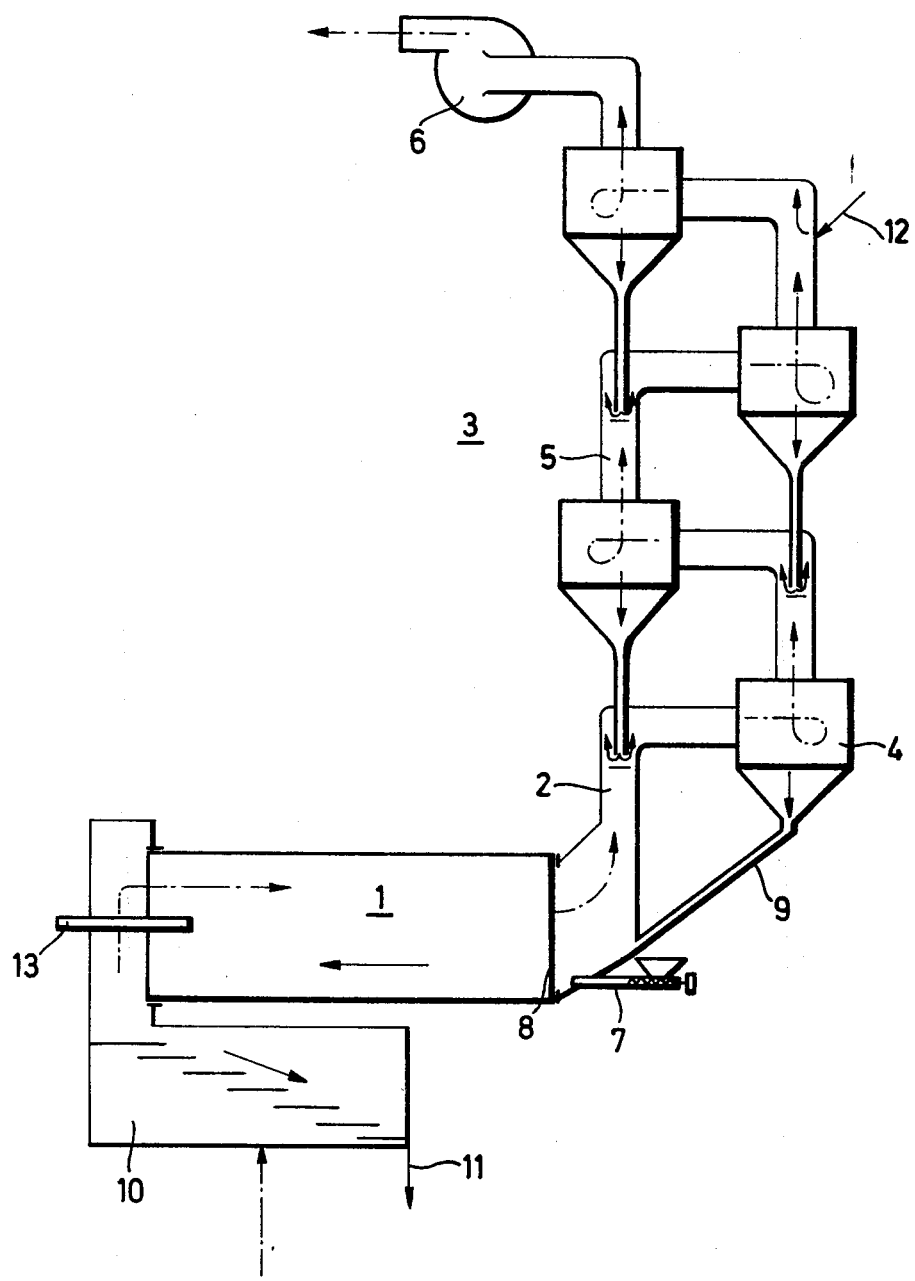

METHOD AND APPARATUS FOR THE THERMAL TREATMENT OF FINE-GRAINED MATERIAL WITH HOT GASES

The invention relates to a method for the heat treatment of fine-grained material, such as lime, argillaceous earth, dolomite, magnesite, comminuted raw material for cement, or the like, whereby the material is preheated and heated by means of the hot exhaust gases of a calcining furnace, and during supply of fuel is subjected to the deacidification of the portions of calcium carbonate and then burnt to completion in the calcining furnace. The invention relates also to an apparatus for carrying out the calcining process.

It is known upon the production of cement to carry out almost completely through an additive-calcination-device in the exhaust conduit between a rotary kiln and a cyclone-heat-exchanger operating according to a suspension gas principle, the deacidification of the raw material to be used in the manufacture of cement in the heat exchanger. For this purpose, high-grade fuels are supplied in finely divided form to the stream of material before its dispersion in the stream of gas (German Laid Open Specification No. 23 24 519). With lack of oxygen, the finely divided fuel reacts, however, chemically with the constituents of comminuted raw material. It results in agglomeration phenomena in the comminuted raw material, so that the quantity of heat required for a positive calcination of the comminuted raw material can not at all be absorbed by the comminuted material. An unequally deacidified comminuted material for cement, and increased use of heat and higher losses of exhaust gas are the positive results.

From the German Laid Open Specification No. 25 45 933, corresponding to U.S. Pat. No. 4,083,676 a method is known for the thermal treatment of comminuted raw material for cement, in which high-grade fuel in finely divided form is sprayed on the surface of the material introduced directly from a suspension-gas-preheater into a rotary kiln. Directly thereafter, the finely divided fuel is to be covered by the material newly introduced or rotated, respectively in the rotary kiln. In this way is to be attained a homogeneous mixture of material and fuel. This has as a result the disadvantage that the particles of fuel present in finely divided form, meet with their large surface shock-like combustion conditions and an uncontrolled combustion, which leads to overheating phenomena of the material already precalcined to a fargoing extent. In other areas, to the contrary, here also the carbon reacts upon lack of oxygen chemically with the constituents of comminuted raw material, and render its calcination impossible to a fargoing extent. In addition, the danger exists of greater caking in the furnace, which negatively influences the conduct of the furnace.

In order to limit the use of high-grade, expensive fuels, it is known from the German Pat. No. 1,251,688 to introduce the deacidification of the portion of calcium carbonate in the comminuted raw material for cement through partial use of lower-grade fuels, as for example, oil-shale, bituminous limestone or mining-dirt. There is added to the comminuted limestone, oil shale in fine-grained form (4 to 7 mm) in a special turbulence- or centrifugal-furnace arranged between heat exchanger system and rotary kiln. The specific installation costs are not unappreciably increased by means of this measure.

With this state of the art, it is the object of the invention to decrease the expenditure of heat for the calcination of cement clinker by means of an optimal calcination of the comminuted raw material, and to improve the economy of the calcination process by means of utilization of fuels whose preparation costs are low, which if need be, may be of lesser quality and which may be burnt in already present installation parts.

This object is solved with the invention thereby, that the fuel, for the deacidification of the portion of calcium carbonate is supplied in coarse pieces to the non-dispersed stream of material in the material-inlet-area of the calcination furnace.

By means of this measure, in surprising manner it is attained, that the coarse fuel-granulate, burning up slowly, may give off its heat completely to the dust-fine comminuted raw material for cement in the furnace. In this connection, the coarse granulates are disposed on the bed of comminuted raw material in the furnace and may be in direct contact with the oxygen-containing hot furnace exhaust gases. An oxidation of the fuel during lack of air and therewith chemical reactions between carbon and comminuted raw material are agglomerations in the comminuted raw material and thereby completely prevented. The gasification and oxidation of the fuel progresses in this connection directly on account of the coarse granulation so uniformly that the heat from the large surface of the dust-fine comminuted raw material, being released, may be absorbed uniformly for the deacidification. In this way, the conditions necessary for an optimal deacidification of the material, namely, high deacidification temperature and a long deacidification time, may be attained with the least possible expenditure.

In development of the invention, it is provided that the fuel is broken, however, unground. In this way, expensive comminution- and grinding-assemblies are saved. This is of advantage particularly then when a fuel-containing component of comminuted raw material is used. For previously with grinding to fine dust similar to comminuted raw material of this component, for example, in a tube mill, in view of the high temperatures prevailing there of circa 200° C., there existed appreciable danger of explosion. It is suitable in this connection that the fuel is broken to a grain size below 50 mm., preferably between 10 and 40 mm. With this grain spectrum of the solid fuel, it may be guaranteed that the calcination of the comminuted raw material already partially calcined in the heat exchanger to 100% in the material inlet area of the rotary kiln, still takes place in front of its sintering zone.

The invention relates also to an apparatus for the heat treatment of fine-grained material according to the method in accordance with the invention, in which in the transition area of the preheater to the calcination furnace, at least one supply device is arranged for solid fuel-granulates. Through this constructive measure, with the least apparatus-type devices, for example, by means of a screw or worm conveyor, the solid fuel granulates are added to the preheater-calcination furnace system exactly there where the material issuing from the preheater is present exactly even in non-dispersed form, so that the granulates for a time as long as possible may transfer, burning off on the surface of the comminuted material, their sensible heat to the comminuted raw material. It is possible with advantage in another development of the invention, to arrange the fuel supply device in the static part of the inlet-head of the calcination furnace, whereby particularly with advantage the possibility of a pneumatic addition of fuel in the calcination furnace is taken into account.

The invention will be described in greater detail on the basis of an embodiment by way of example.

The installation for the heat treatment of comminuted raw material for use in the manufacture of cement, not restricted to the embodiment by way of example, the treatment consisting of one with hot gases, —in several steps—consists in a rotary kiln 1, which is in connection through an exhaust-gas-conduit 2 with a suspension-gas-heat-exchanger 3 consisting of several cyclones which are superimposed. The cyclone separators 4 are connected with one another with gas conduits 5. Attached to the uppermost cyclone of the suspension-gas-heat-exchanger is an exhaust-gas-blower 6, which is in communication with the surrounding atmosphere.

The cement installation has in the static part of the inlet head, a fuel supply device 7 for solid fuel-granulates, which preferably consists of a conveyor worm operating gastight. Alternatively hereto, the fuel supply device may be arranged in the material conduit 9 extending between the lowermost cyclone 4 and the material inlet head 8 of the rotary kiln 1.

At the end of the rotary kiln is disposed as clinker-cooler a grid-cooler 10, from which the clinker 11 burnt to completion is drawn off.

In the operation of the installation, the dust-fine comminuted raw material for cement in known manner is introduced at 12 into the uppermost gas conduit of the cyclone-heat-exchanger 3 in exactly determined quantity. From there, the comminuted raw material for cement passed through from cyclone step to cyclone step, being heated more strongly by the suspension-gas-heat-exchanger in countercurrent to the furnace-exhaust-gases from the top downward. From the lowermost cyclone 4 of the suspension-gas-heat-exchanger 3, the heated and already partially pre-calcined comminuted raw material for cement enters through the material-discharge-conduit 9 into the inlet head 8 of the rotary kiln 1. Through the gastight worm conveyor constructed as fuel feed device 7, broken solid fuel as for example freshly mined coal is supplied to the inlet-head 8 of the rotary kiln for the comminuted raw material for cement. Through the rotary movement of the furnace, a lasting rotation takes place of the comminuted raw material for cement entered into the furnace, whereby the coarse broken pieces of fuel of approximately 10–40 mm. grain are stored on the surface of the bed of comminuted raw material. There, the fuel burning out in the hot stream of gas, transfers its heat slowly to the comminuted raw material for cement, so that the complete deacidification of the constituents of calcium carbonate in the comminuted raw material may still be carried out in the rotary kiln in front of the sintering zone.

After passage of the calcined comminuted raw material for cement through the sintering zone of the rotary kiln, the latter is guided over as hot cement clinker into the grid cooler, in which the clinker is cooled by means of cooling air at further processing temperature. The heated cooling air is thus introduced as combustion air for the fuel supplied at 13 to the rotary kiln 1 as well as also as combustion air for the solid coal-granulates introduced through the fuel feed device 7 into the furnace inlet head 8.

The invention is not limited solely to the embodiment shown by way of example, but it lies also within the scope of the invention, that the solid broken fuel may be of lower-grade quality, as for example, oil shale, oil-carbon, rubber-containing waste products or the like.

We claim:

1. In a method of heat treating comminuted raw material in which said material is preheated in a preheater by means of hot exhaust gases from a kiln, separately calcined for the deacidification of a portion of the calcium carbonate present and subsequently burnt to completion in said kiln, the improvement which comprises the steps of:

depositing a bed of said comminuted raw material in said kiln;

supplying coarse pieces of fuel having a grain size in the range of 10 to 40 mm to said kiln to cover said bed of raw material;

utilizing an effective portion of said exhaust gases in said kiln to oxidize said fuel and to generate a temperature sufficient to effect calcination in said bed; and conducting the separate calcination of said material in said bed in said kiln.

2. A method according to claim 1 in which the temperature at which said calcination of said material in said bed in said kiln is conducted is controlled by introducing coarse fuel which is no more than partially dried into said material outlet.

* * * * *